No. 627,729. Patented June 27, 1899.
S. GUDEMAN.
FILTER.
(Application filed Nov. 14, 1898.)
(No Model.)

WITNESSES:
J H Blauch
C. Wolf

INVENTOR
Samuel Gudeman
By L. M. Thurlow
ATTY.

UNITED STATES PATENT OFFICE.

SAMUEL GUDEMAN, OF EUREKA, ILLINOIS.

FILTER.

SPECIFICATION forming part of Letters Patent No. 627,729, dated June 27, 1899.

Application filed November 14, 1898. Serial No. 696,350. (No model.)

*To all whom it may concern:*

Be it known that I, SAMUEL GUDEMAN, a citizen of the United States, residing at Eureka, in the county of Woodford and State of Illinois, have invented certain new and useful Improvements in Filters; and I do hereby declare that the following is a full, clear, and exact description of the invention, which will enable others skilled in the art to which it appertains to make and use the same.

This invention relates to improvements in filters, and more particularly to that class used for filtering water for cisterns.

The object of the invention is to provide a filter so arranged as to its several parts that the water is caused to pass down through a filtering medium and then to rise through a second medium before passing into the cistern, thereby more perfectly eliminating all floating or visible foreign matter therefrom.

A further object of this invention is to arrange outlets for the filter through which all stagnant water may pass, and thus keep the device perfectly clean and pure, this being accomplished by an automatic arrangement.

Figure 1:
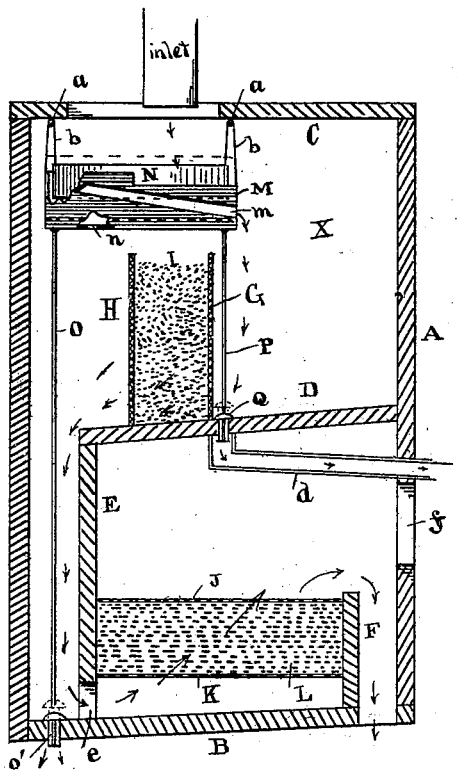
Figure 2:
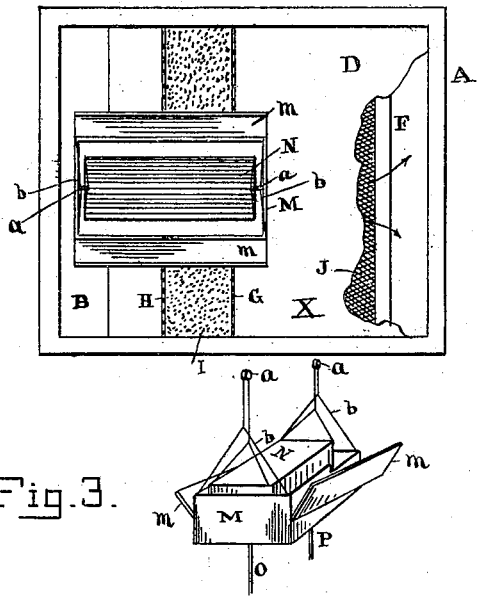
Figure 3:
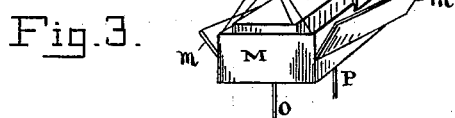

In the drawings forming a part of this application, Figure 1 is a sectional elevation of the filter. Fig. 2 is a plan view of the same; and Fig. 3 is a perspective view of a bucket and float, showing connections of cords or chains.

In the figures, A indicates the sides of the filter-body; B, the bottom; C, the top; and D a slanting water-table at about the middle of the height of the device, while E is a dividing-wall for the filtering-compartments. Within the upper chamber of the filter are erected two perforated partitions G and H, which together form a cell for filtering material I, such as gravel or charcoal, or both.

A vertical wall F is erected in the lower chamber of the filter and rests upon the bottom B. The bottom between the said wall F and the side is cut out, thereby forming an outlet for the filtered water. A horizontal strainer L is supported between the walls E and F and is covered with charcoal and gravel or other suitable material, and upon this is laid, if necessary, a second strainer J. This forms a second filtering-cell L. The wall E beneath this filtering layer is cut out, as shown in Fig. 1 at $e$, to allow the water to pass from one chamber into the other. To the top C is hung a bucket M by means of pulleys $a\,a$ and chains or cords $b$. Within the bucket is a float N, to which the ends of the cord or chain are attached. Upon the sides of the bucket are troughs $m$, which are designed to lead any water flowing therefrom into the first water-chamber. To the bottom of the bucket is attached a rod carrying at its lower end a valve O', which closes an opening in the lowest portion in the slanting bottom B. A rod P is also secured to the bottom of the bucket and carries a valve Q, closing an opening in the slanting table D. Beneath the valve Q is a waste-pipe $d$ for carrying away any water from the chamber above it.

A hand-hole $f$ in the side of the filter permits the lower filtering portion to be reached with ease when desired.

The operation may be understood from what follows. When the filter is idle, the float $n$ is heavier than the bucket, and consequently sinks and raises, by means of the cords or chains, the bucket and its valves. When in this position, all water passes out and away and washes with it all sediment, leaving the filter perfectly clean. The water on entering through the inlet-pipe falls into the bucket M. The weight thereof overcomes that of the float and descends. The water runs from the bucket into the chamber X, thence through the filtering layer I, thence down to the lower part of the filter and up through the layer L, and passes over the partition or wall F into the cistern. When the water ceases to enter the filter, the water contained in the bucket M gradually flows out through the vent $n$. The weight of the bucket is thus made lighter than the float and rises by reason of the weight of that portion, raises the valves, and empties the filter.

Having thus described my invention, what I claim as new, and desire to secure by Letters Patent, is—

1. In a filter of the character described, the combination with the body thereof, of a water-table dividing the filter into two compartments, an upper and a lower, a vertical filtering-cell in the upper chamber, a horizontal filtering-cell in the lower chamber and means for causing the water to flow downward through the upper cell and up through the lower cell to its exit substantially as set forth and for the purpose described.

2. In a filter of the character described, the combination with the body thereof of the water-table dividing the filter into an upper and lower compartment, a filtering-cell erected in the upper compartment, a horizontal filtering-cell in the lower compartment, a bucket hung in the upper portion of the filter, a float therein, cords or chains connecting the two, pulleys over which the cords run, rods on the bottom of the bucket, valves on the ends of the rods, an opening in the slanting water-table, an opening in the bottom B and adapted to be closed by the valves on the rods substantially as and for the purpose herein set forth and described.

In testimony whereof I affix my signature in presence of two witnesses.

SAMUEL GUDEMAN.

Witnesses:
   CHARLES J. WOLFE,
   A. KEITHLEY.